US011165617B1

(12) United States Patent
Talakoub et al.

(10) Patent No.: US 11,165,617 B1
(45) Date of Patent: Nov. 2, 2021

(54) ELECTRONIC DEVICES WITH CREST FACTOR REDUCTION CIRCUITRY

(71) Applicant: Apple Inc., Cupertino, CA (US)

(72) Inventors: Shahram Talakoub, San Jose, CA (US); Matthew N. Ettus, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,572

(22) Filed: Sep. 24, 2020

(51) Int. Cl.
*H04L 27/26* (2006.01)
*H04B 1/04* (2006.01)
*H04B 7/06* (2006.01)
*H04B 1/10* (2006.01)

(52) U.S. Cl.
CPC .......... *H04L 27/2623* (2013.01); *H04B 1/04* (2013.01); *H04B 1/10* (2013.01); *H04B 7/0615* (2013.01); *H04B 2001/0408* (2013.01)

(58) Field of Classification Search
CPC ..... H04L 27/00; H04L 27/26; H04L 27/2601; H04L 27/2614; H04L 27/2618; H04L 27/2623; H04L 27/2624; H04L 27/2626; H04L 27/2627; H04L 27/2628; H04L 27/2634; H04B 1/04; H04B 1/0475; H04B 1/0483; H04B 1/10; H04B 7/0613; H04B 7/0615; H04B 7/0617; H04B 2001/0408; H04B 2001/0425; H04B 2001/0433
See application file for complete search history.

(56) References Cited

U.S. PATENT DOCUMENTS

| 7,224,742 B2 * | 5/2007 | Cleveland ........... H04L 27/2618 375/260 |
| 8,344,945 B2 | 1/2013 | Craig et al. |
| 8,446,979 B1 * | 5/2013 | Yee ........................ H03F 1/3258 375/296 |
| 10,516,461 B2 | 12/2019 | Mondal et al. |
| 2004/0243258 A1 | 12/2004 | Shattil |
| 2007/0211786 A1 | 9/2007 | Shattil |

(Continued)

OTHER PUBLICATIONS

Krongold et al., PAR Reduction in OFDM via Active Constellation Extension, IEEE Transactions on Broadcasting, vol. 49, No. 3, Sep. 2003, pp. 258-268.

*Primary Examiner* — Siu M Lee
(74) *Attorney, Agent, or Firm* — Treyz Law Group, P.C.; Michael H. Lyons (57) ABSTRACT

An electronic device may include a baseband processor and P antenna elements. The antenna elements may concurrently convey signals within M signal beams. The baseband processor may have a demultiplexer that receives a stream of M symbols. The processor may have M parallel data paths coupled between the demultiplexer and a beam former. The beam former may be coupled to amplifier circuitry over P parallel data paths. Inverse fast Fourier transformers (IFFTs) may be interposed on the M parallel data paths. A feedback path may be coupled between the M parallel data paths and the P parallel data paths. Crest factor reduction (CFR) circuitry may be interposed on the feedback path. The CFR circuitry may perform CFR operations on signals from the P parallel data paths iteratively and concurrently. This may minimize PAR in the system while supporting concurrent transmission of radio-frequency signals in multiple signal beams.

20 Claims, 7 Drawing Sheets

(56) References Cited

U.S. PATENT DOCUMENTS

2011/0150130 A1\* 6/2011 Kenington ................ H03F 3/24
  375/296
2015/0156777 A1 6/2015 Negus et al.
2020/0374186 A1 11/2020 Scott \* cited by examiner

ELECTRONIC DEVICES WITH CREST FACTOR REDUCTION CIRCUITRY

FIELD

This relates generally to electronic devices, including electronic devices with wireless circuitry.

BACKGROUND

Electronic devices are often provided with wireless circuitry. The wireless circuitry includes a baseband processor and antennas. The baseband processor transmits data and the antennas transmit radio-frequency signals corresponding to the data. Amplifier circuitry amplifies the data prior to transmission by the antennas. The data may exhibit a high dynamic range due to processes in the baseband processor that aggregate or segregate the data. However, if care is not taken, the high dynamic range of the data can degrade the performance of amplifier circuitry in external equipment that receives the radio-frequency signals transmitted by the antennas.

It may therefore be desirable to be able to provide electronic devices with improved wireless circuitry for transmitting radio-frequency signals.

SUMMARY

An electronic device may include wireless circuitry. The wireless circuitry may include a baseband processor, a transmitter, and a phased array antenna having P antenna elements. The phased array antenna may concurrently convey radio-frequency signals within M signal beams oriented in different beam directions. The baseband processor may have a demultiplexing switch that receives a stream of M sequential symbols for transmission within the M signal beams.

The baseband processor may have M parallel data paths coupled between the switch and an M-by-P beam former. The beam former may be coupled to amplifier circuitry over P parallel data paths. Inverse fast Fourier transformers (IFFTs) may be interposed on the M parallel data paths. A feedback path may be coupled between the M parallel data paths and the P parallel data paths around the beam former and the IFFTs. Crest factor reduction (CFR) circuitry may be interposed on the feedback path.

The demultiplexer may convert the M sequential symbols into M parallel frequency domain signals on the M parallel data paths, each corresponding to a respective one of the M sequential symbols. The IFFTs may convert the M parallel frequency domain signals into M parallel time domain signals. The beam former may convert the M parallel time domain signals into P parallel output signals on the P parallel data paths. The CFR circuitry may perform CFR operations on each of the P parallel output signals concurrently. The CFR circuitry may perform clipping, matrix multiplication, a fast Fourier transform, CFR term selection, and subtraction on the P parallel output signals to produce M parallel extended signals. The CFR term selection may involve replacing symbols in the output signals with corresponding symbols from the M parallel frequency domain signals when the symbols have moved in an invalid direction on the constellation diagram associated with the M parallel frequency domain signals. The M parallel extended signals may be fed back into the M parallel data paths for subsequent processing iterations until the peak-to-average power ratio (PAR) of signals on the P parallel data paths is below a predetermined threshold or a predetermined maximum number of iterations has been reached. This may minimize PAR in the system, thereby optimizing receiver amplifier performance, while also supporting concurrent transmission of radio-frequency signals in multiple signal beams.

DETAILED DESCRIPTION

Figure 1:
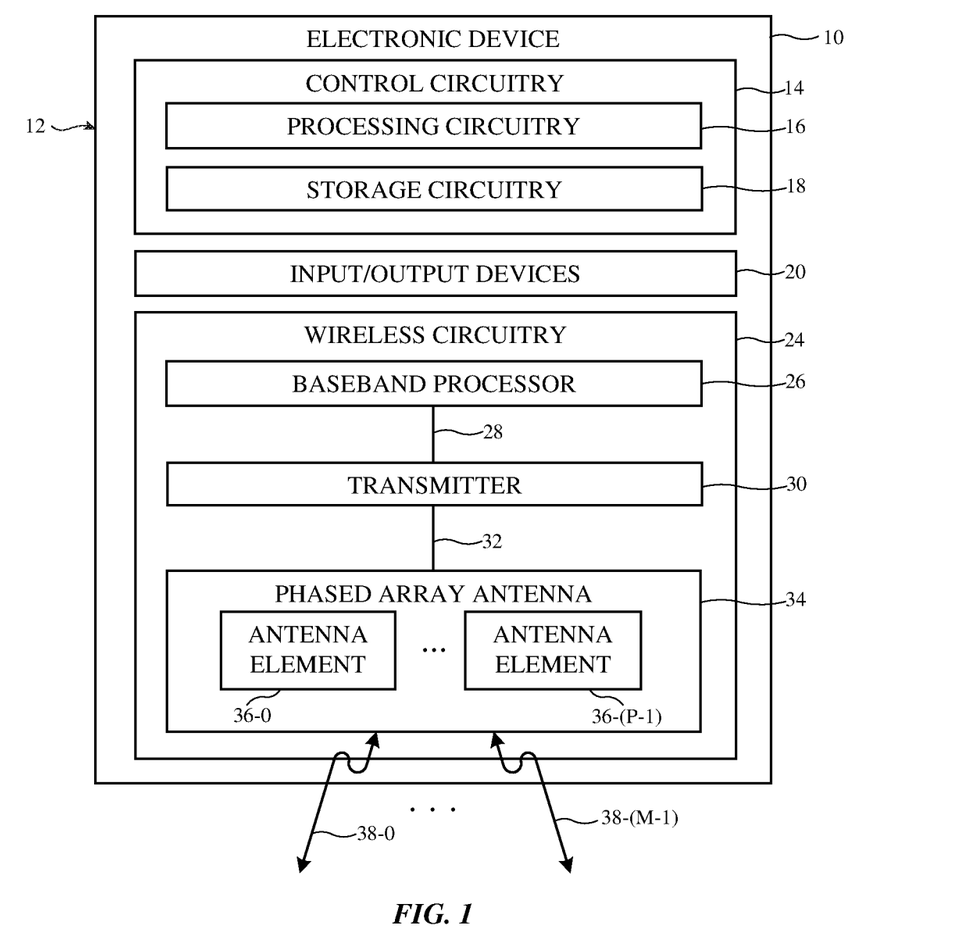
FIG. 1 is a schematic diagram of an illustrative electronic device having a baseband processor and multiple antenna elements in accordance with some embodiments.

FIG. 1 is a schematic diagram of an illustrative electronic device having wireless communications capabilities. Electronic device 10 of FIG. 1 may be a computing device such as a laptop computer, a desktop computer, a computer monitor containing an embedded computer, a tablet computer, a cellular telephone, a media player, or another handheld or portable electronic device, a smaller device such as a wristwatch device, a pendant device, a headphone or earpiece device, a device embedded in eyeglasses or other equipment worn on a user's head, or other wearable or miniature device, a television, a computer display that contains an embedded computer, a computer display that does not contain an embedded computer, a gaming device, a navigation device, an embedded system such as a system in which electronic equipment is mounted in a kiosk, building, satellite, or vehicle, a wireless internet-connected voice-controlled speaker, a home entertainment device, a remote control device, a gaming controller, a peripheral user input device, a wireless base station or access point, equipment that implements the functionality of two or more of these devices, or other electronic equipment. Electronic device 10 may sometimes also be referred to herein as a communications terminal, a communications node, or user equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements. Housing 12 may include a frame (e.g., a conductive or dielectric frame), support structures (e.g., conductive or dielectric support structures), housing walls (e.g., conductive or dielectric housing walls), or any other desired housing structures.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as navigation software, internet browsing applications, voice-over-internet-protocol (VOIP) telephone call software, email software, media playback software, communications routing software, operating system software, etc. Control circuitry 14 may also be used in implementing one or more wireless communications protocols (e.g., wireless communications protocols associated with different radio-access technologies that are used to wirelessly convey data over wireless communications links with external communications equipment).

Device 10 may include input/output devices 20. Input/output devices 20 are used in providing input to and output from device 10. For example, input/output devices 20 may include one or more displays such as a touch sensitive display, a force sensitive display, a display that is both touch sensitive and force sensitive, or a display without touch or force sensor capabilities. The display may be a liquid crystal display, a light emitting diode display, an organic light emitting diode display, or any other desired type of display. Input/output devices 20 may include other components such as sensors (e.g., light sensors, proximity sensors, range sensors, image sensors, light sensors, audio sensors such as microphones, force sensors, moisture sensors, temperature sensors, humidity sensors, fingerprint sensors, pressure sensors, touch sensors, ultrasonic sensors, orientation sensors, accelerometers, gyroscopes, compasses, etc.), status indicator lights, speakers, vibrators, keyboards, touch pads, buttons, joysticks, etc.

Device 10 may include wireless communications circuitry such as wireless circuitry 24. Wireless circuitry 24 may include a baseband processor such as baseband processor 26, radio-frequency transmitter circuitry such as transmitter 30, and P antenna elements 36 (e.g., a first antenna element 36-0, a second antenna element 36-1, a $P^{th}$ antenna element 36-(P−1), etc.). In one suitable arrangement that is sometimes described herein as an example, antenna elements 36 are arranged into a corresponding phased array antenna such as phased array antenna 34. Phased array antenna 34 may sometimes also be referred to as a phased antenna array. Antenna elements 36 may sometimes also be referred to herein as antennas.

Baseband processor 26 may be coupled to transmitter 30 over baseband path 28. Transmitter 30 may be coupled to phased array antenna 34 over radio-frequency transmission line path 32. Radio-frequency transmission line path 32 may include one or more radio-frequency transmission lines (e.g., respective radio-frequency transmission lines that couple transmitter 30 to each antenna element 36 in phased array antenna 34). If desired, radio-frequency front end circuitry may be interposed on radio-frequency transmission line path 32 between transmitter 30 and phased array antenna 34.

In the example of FIG. 1, wireless circuitry 24 is illustrated as including only a single transmit chain having a single baseband processor 26, a single transmitter 30, and a single phased array antenna 34 for the sake of clarity. In general, wireless circuitry 24 may include any desired number of baseband processors 26, any desired number of transmitters 30, and any desired number of phased array antennas 34. Wireless circuitry 24 may also include one or more receive chains coupled to phased array antenna 34 (e.g., a receive chain that includes a receiver coupled between phased array antenna 34 and baseband processor 26 for conveying wireless data received by phased array antenna 34 to baseband processor 26).

In performing wireless transmission, baseband processor 26 may provide baseband signals to transmitter 30 over baseband path 28. For example, the baseband processor may process incoming digital data through encoding, modulation/demodulation, time and frequency conversions, pulse shaping, etc., to generate processed baseband data that is conveyed by the baseband signals. Transmitter 30 may modulate the processed baseband data onto radio-frequency signals for transmission by phased array antenna 34. For example, transmitter 30 may include mixer circuitry and local oscillator circuitry for up-converting the baseband signals to radio-frequencies prior to transmission over phased array antenna 34. Transmitter 30 may also include digital-to-analog converter (DAC) circuitry for converting signals between digital and analog domains. Transmitter 30 may transmit the radio-frequency signals over phased array antenna 34 via radio-frequency transmission line path 32. Phased array antenna 34 may transmit the radio-frequency signals to external wireless equipment by radiating the radio-frequency signals into free space.

Antenna elements 36 may include any desired radiating structures such as patch antenna radiating elements, dipole antenna radiating elements, monopole antenna radiating elements, inverted-F antenna radiating elements, planar inverted-F antenna radiating elements, slot antenna radiating elements, helical antenna radiating elements, waveguide radiators, or combinations of these and/or other types of radiating structures. The radiating elements may each be fed by one or more antenna feeds (e.g., for covering one or more polarizations). Each antenna element 36 in phased array antenna 34 may have an individually controlled phase and magnitude that is selected to steer a corresponding radio-frequency signal beam 38 in a particular direction (e.g., via constructive and destructive interference across each of the antenna elements). Each signal beam 38 may have a particular beam pointing angle or beam direction that is defined by the angle at which the signal beam exhibits peak gain.

In one suitable arrangement that is described herein as an example, phased array antenna 34 may concurrently convey radio-frequency signals within multiple signal beams 38 that are each oriented in different respective beam directions. In one suitable arrangement that is described herein as an example, phased array antenna 34 may concurrently convey radio-frequency signals within M signal beams 38 that are each oriented in a respective beam direction (e.g., a first signal beam 38-0 oriented in a first beam direction, an $M^{th}$ signal beam 38-(M−1) oriented in an $M^{th}$ beam direction, etc.). Different signal beams 38 may be used to concurrently communicate with different external wireless equipment at different locations relative to device 10 (e.g., locations overlapping the signal beams). The external wireless equipment may include other devices such as device 10, user equipment, wireless base stations, wireless access points, wireless gateways, etc.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband processor 26 and/or portions of transmitter 30 (e.g., a host processor on transceiver 30) may form a part of control circuitry 14.

In general, transmitter 30 may be configured to cover (handle) any suitable communications bands of interest. Transmitter 30 may transmit radio-frequency signals in the communications bands using antenna elements 36 (e.g., using signal beams 38 produced by phased array antenna 34). Control circuitry 14 may control baseband processor 26 to format wireless data for transmission via the radio-frequency signals in accordance with the communications protocol(s) corresponding to the communications bands of the radio-frequency signals. As examples, the communications bands that are handled by transmitter 30 (e.g., for transmitting radio-frequency signals within signal beams 38) may include wireless local area network (WLAN) communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) communications bands such as the 2.4 GHz Bluetooth® band, 4G LTE bands (e.g., a cellular low band between about 600 to 960 MHz, a cellular low-midband between about 1400 to 1550 MHz, a cellular midband between about 1565 to 1610 MHz, a cellular high band between about 2300 to 2700 MHz, a cellular ultra-high band between about 3400 to 3800 MHz, etc.), GSM bands, UMTS bands, 5G bands (e.g., sub-10 GHz 5G bands and/or 5G bands at frequencies greater than 10 GHz such as frequencies between about 24 and 31 GHz, between about 37 and 40 GHz, and/or around 60-70 GHz), satellite navigation and/or communications bands, an Ultra High Frequency (UHF) band between about 300 MHz and 3 GHz, an L band between about 1 and 2 GHz, an S band between about 2 and 4 GHz, a C band between about 4 and 8 GHz, an X band between about 8 and 12 GHz, a $K_u$ band between about 12 and 18 GHz, a K band between about 18 and 26.5 GHz, a $K_a$ band between about 26.5 and 40 GHz, a V band between about 40 and 75 GHz, a W band between about 75 and 110 GHz, an IEEE 802.15.4 ultra-wideband communications band between about 5 GHz and about 8.5 GHz, and/or any other desired communications bands. Communications bands may sometimes be referred to herein as frequency bands or simply as "bands" and may span corresponding ranges of frequencies.

In one suitable arrangement that is described herein as an example, the wireless data transmitted by baseband processor 26 may include a stream of multiple successive orthogonal frequency-division multiplexing (OFDM) symbols. The OFDM symbols may be multiplexed through beam forming circuitry and may be amplified by amplifier circuitry prior to transmission to transmitter 30. If care is not taken, the high dynamic range of these aggregated signals may significantly degrade the performance of amplifier circuitry in external communications equipment that receives the signals transmitted by transmitter 30 and phased array antenna 34. In order to mitigate this degradation, baseband processor 26 may include crest factor reduction circuitry that performs crest factor reduction operations on the OFDM symbols prior to amplification. The crest factor reduction operations may reduce the crest factor and thus the peak-to-average power ratio (PAR or PAPR) of the wireless data prior to amplification.

In some scenarios, the crest factor reduction circuitry in baseband processor 26 applies crest factor reduction to each OFDM symbol individually (e.g., by optimizing the PAR of each individual OFDM symbol in sequence before a subsequent OFDM symbol is processed). However, performing sequential crest factor reduction in this way can lose its advantage when multiple symbols are combined through a beam former and amplifier circuitry for simultaneous transmission within multiple signal beams 38. In general, the greater the number of aggregated OFDM symbols, the less PAR reduction is provided by each individual OFDM PAR optimization.

Figure 2:
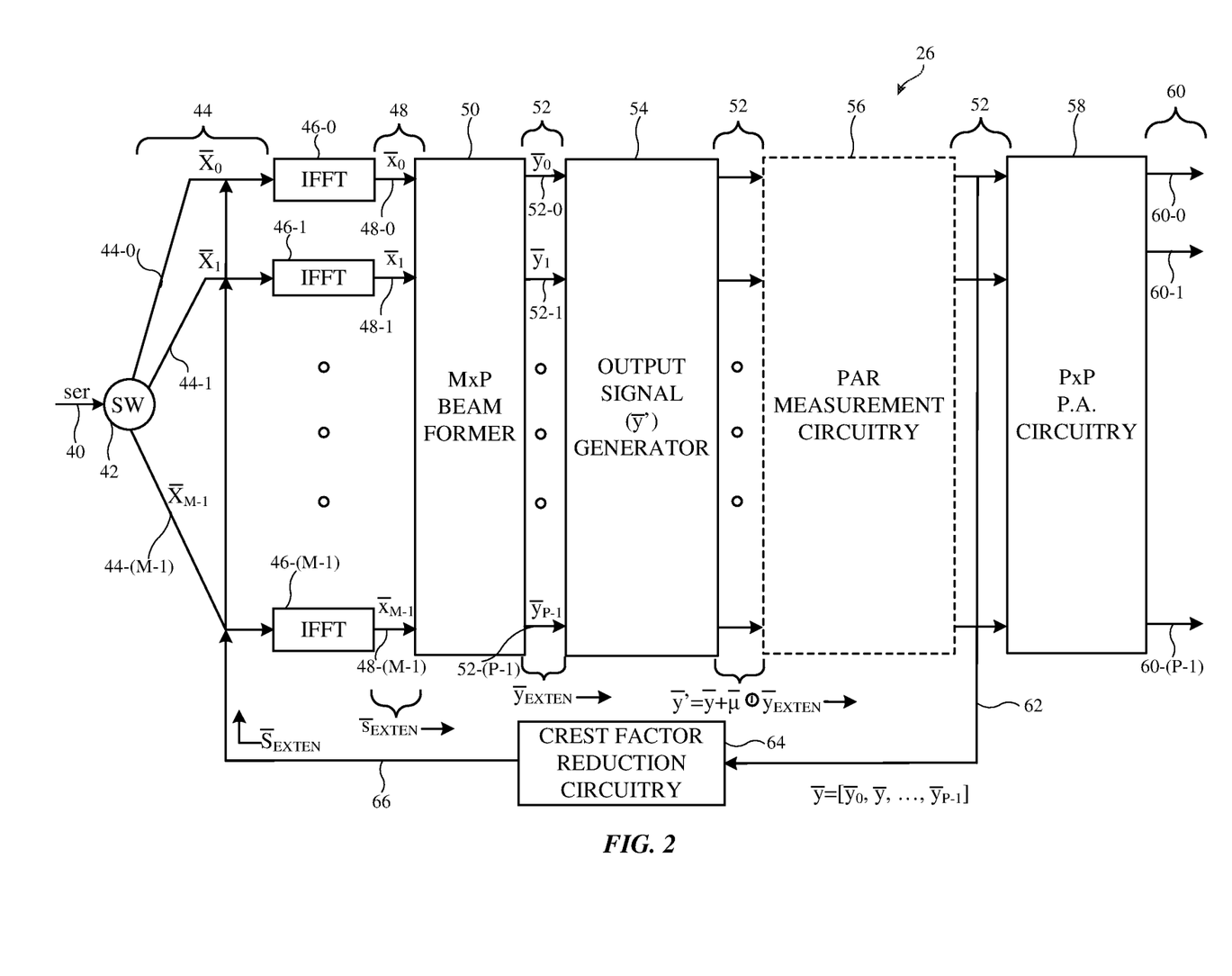
FIG. 2 is a circuit diagram of an illustrative baseband processor having crest factor reduction circuitry that concurrently operates on multiple OFDM symbols in parallel in accordance with some embodiments.

In order to minimize PAR while combining multiple OFDM symbols for concurrent transmission within multiple signal beams 38, baseband processor 26 may include crest factor reduction circuitry that concurrently operates on each OFDM symbol in parallel. FIG. 2 is a circuit diagram showing how baseband processor 26 may include crest factor reduction circuitry that concurrently operates on multiple OFDM symbols in parallel.

As shown in FIG. 2, baseband processor 26 may have a serial input path 40 coupled to the input of demultiplexing switch (SW) 42. Switch 42 may sometimes be referred to herein as demultiplexer 42. Switch 42 may receive a stream of serial data ser over serial input path 40. Serial data ser includes a series of successive modulated symbols in the frequency domain that may create M OFDM symbols of length N in the time domain to be aggregated in baseband processor 26 for transmission by the phased array antenna. There may, for example, be as many OFDM symbols produced from serial data ser as the number of concurrent signal beams 38 formable using phased array antenna 34 of FIG. 1 (e.g., each symbol may correspond to a respective one of the signal beams 38). The modulated symbols in serial data ser may, for example, be modulated using quadrature amplitude modulation (QAM), phase-shift keying (PSK), or any other desired modulation scheme. The modulated symbols are mapped to subcarriers. An inverse fast Fourier transform operation can be performed on the modulated symbols to produce corresponding OFDM symbols in the time domain.

The output of switch 42 may be coupled to the inputs of inverse fast Fourier transform circuitry such as inverse fast Fourier transformers 46 via M parallel data paths 44 (e.g., a first data path 44-0 may couple switch 42 to a first inverse fast Fourier transformer (IFFT) 46-0, a second data path 44-1 may couple switch 42 to a second IFFT 46-1, an $M^{th}$ data path 44-(M−1) may couple switch 42 to an $M^{th}$ IFFT 46-(M−1), etc.). Inverse fast Fourier transformers 46 may convert frequency domain signals on data paths 44 into corresponding time domain signals that are output onto M parallel data paths 48.

Baseband processor 26 may include beam forming circuitry such as beam former 50. The outputs of inverse fast Fourier transformers 46 may be coupled to input ports of beam former 50 via data paths 48 (e.g., the output of IFFT 46-0 may be coupled to a first input port of beam former 50 over a first data path 48-0, the output of IFFT 46-1 may be coupled to a second input port of beam former 50 over a second data path 48-1, etc.). Beam former 50 may be, for example, an M-by-P beam former having M input ports and P output ports. Each of the M input ports may be coupled to a respective data path 48. Each of the P output ports may be coupled to a respective data path 52 (e.g., beam former 50 may have a first output port coupled to a first data path 52-0, a second output port coupled to a second data path 52-1, a $P^{th}$ output port coupled to a $P^{th}$ data path 52-(P−1), etc.). There may be, for example, as many data paths 52 as there are antenna elements 36 or antenna feeds in phased array antenna 34 (FIG. 1). Beam former 50 may, for example, include circuitry that serves to map different beam directions (e.g., directions for signal beams 38 of FIG. 1) to sets of stimuli that are used to excite antenna elements 36 to produce signal beams in each of the signal beam directions.

Amplifier circuitry such as power amplifier circuitry 58 may be coupled to beam former 50 over data paths 52. While power amplifier circuitry 58 is illustrated together with the circuitry of baseband processor 26 in the example of FIG. 2, power amplifier circuitry 58 may be formed external to baseband processor 26. Power amplifier circuitry 58 may, for example, be a P-by-P power amplifier stage having P input ports and P output ports. Each of the P input ports may be coupled to a respective data path 52. Each of the P output ports may be coupled to a respective one of P output paths 60 (e.g., power amplifier circuitry 58 may have a first output port coupled to a first output path 60-0, a second output port coupled to a second output path 60-1, a $P^{th}$ output port coupled to a $P^{th}$ output path 60-(P−1), etc.). Output paths 60 may collectively form baseband paths 28 of FIG. 1, for example. Each of the P output paths 60 may be coupled to a respective one of the P antenna elements 36 or to respective antenna feeds in phased array antenna 34 (e.g., via transmitter 30 and radio-frequency line path 32 of FIG. 1). If desired, power amplifier circuitry 58 may include P power amplifiers, each of which is coupled between a respective input port and a respective output port of power amplifier circuitry 58.

As shown in FIG. 2, an output signal generator such as output signal generator 54 may be interposed on data paths 52 between beam former 50 and power amplifier circuitry 58. Output signal generator 54 may generate output signals that are provided to power amplifier circuitry 58 for amplification. Power amplifier circuitry 58 may amplify the output signals produced by output signal generator 54. If desired, optional PAR measurement circuitry such as PAR measurement circuitry 56 may be interposed on data paths 52 between output signal generator 54 and power amplifier circuitry 58. PAR measurement circuitry 56 may measure PAR values of the output signals produced by output signal generator 54 prior to amplification of the output signals by power amplifier circuitry 58. The amplified output signals may be conveyed to each of the antenna elements 36 in phased array antenna 34 (FIG. 1) to produce up to M concurrent signal beams (e.g., signal beams 38 of FIG. 1) that point in different directions.

In some scenarios, the baseband processor includes only a single series path between input path 40 and the output of the baseband processor, with a single IFFT interposed on the series path. In addition, a single amplifier is interposed on the series path. In these scenarios, crest factor reduction circuitry can be interposed on a feedback path coupled between the input and the output port the single IFFT. The crest factor reduction circuitry then optimizes PAR for one of the M OFDM symbols from serial data ser at a time, in series, until each of the PAR of each of the M OFDM symbols has been reduced. In these scenarios, the antenna(s) coupled to the baseband processor may be incapable of producing multiple concurrent signal beams. If such crest factor reduction circuitry were coupled between the input and output of each IFFT 46 in baseband processor 26 of FIG. 2 (e.g., a baseband processor capable of producing multiple concurrent signal beams), the crest factor reduction circuitry may not perform sufficient crest factor reduction for the signals output from baseband processor 26. In order to perform satisfactory crest factor reduction in baseband processor 26, baseband processor 26 may include crest factor reduction circuitry such as crest factor reduction circuitry 64 that concurrently operates on each of the M OFDM symbols in parallel.

Crest factor reduction circuitry 64 may be interposed on a feedback path that is coupled between data paths 52 and 44. For example, the input of crest factor reduction circuitry 64 may be coupled to data paths 52 over paths 62. Crest factor reduction circuitry 64 may have an output coupled to data paths 44 over paths 66. Paths 62 may include P paths, each of which is coupled to a respective one of the P data paths 52. Paths 66 may include M paths, each of which is coupled to a respective one of the M data paths 44. Paths 66 and paths 62 may sometimes be referred to collectively herein as forming a feedback path of baseband processor 26 (e.g., a feedback path coupled around IFFTs 46 and beam former 50).

Crest factor reduction circuitry 64 may perform crest factor reduction (CFR) operations on serial data ser. The CFR operations may minimize PAR in the signals output on output paths 60. The CFR operations may be performed concurrently for each of the M OFDM symbols from serial data ser (e.g., the CFR operations may be performed on each of the M OFDM symbols in parallel such that PAR is optimized across each of the M OFDM symbols). This may further reduce the PAR of the signals output on output paths 60 relative to scenarios where PAR is minimized for each OFDM symbol in series. The CFR operations may be performed in an iterative manner in which CFR circuitry 64 continues to perform CFR operations on a given set of M OFDM symbols until the PAR of the signals falls below a threshold value.

For example, as shown in FIG. 2, switch 42 may convert serial data ser (e.g., serial data in the frequency domain corresponding to M OFDM symbols in the time domain) into M parallel frequency domain signals. The M parallel frequency domain signals may be identified by a vector $\overline{X}$ and may therefore sometimes referred to herein as frequency domain signals $\overline{X}$. Vector $\overline{X}$ is an M-element vector having M vector elements $\overline{X}_i$ (e.g., a first vector element $\overline{X}_0$, a second vector element $\overline{X}_1$, an $M^{th}$ vector element $\overline{X}_{(M-1)}$, etc.). Each vector element $\overline{X}_i$ may be a set of modulated subcarriers from serial data ser in the frequency domain that corresponds to one of the successive M OFDM symbols in the time domain. Switch 42 may output a respective vector element $\overline{X}_i$ from vector $\overline{X}$ onto each data path 44 (e.g., switch 42 may deserialize serial data ser as frequency domain signals $\overline{X}$, where each vector element $\overline{X}_i$ of frequency domain signals $\overline{X}$ is provided to a respective data path 44). Inverse fast Fourier transformers 46 may receive frequency domain signals $\overline{X}$ over data paths 44 (e.g., IFFT 46-0 may receive vector element $\overline{X}_0$ over data path 44-0, IFFT 46-1 may receive vector element $\overline{X}_1$ over data path 44-1, IFFT 46-(M-1) may receive element $\overline{X}_{(M-1)}$ over data path 44-(M-1), etc.).

Inverse fast Fourier transformers 46 may convert frequency domain signals $\overline{X}$ into M parallel time domain signals. The M parallel time domain signals may be identified by a vector $\overline{x}$ and may therefore sometimes be referred to herein as time domain signals $\overline{x}$. Vector $\overline{x}$ is an M-element vector having M vector elements $\overline{x}_i$ (e.g., a first vector element $\overline{x}_0$, a second vector element $\overline{x}_1$, an $M^{th}$ vector element $\overline{x}_{(M-1)}$, etc.). Each vector element $\overline{x}_i$ is an OFDM symbol (e.g., a time domain version of one of the successive M frequency domain vectors from serial data ser). Inverse fast Fourier transformers 46 may output a respective vector element $\overline{x}_i$ from vector $\overline{x}$ onto each data path 48. Beam former 50 may receive time domain signals $\overline{x}$ over data paths 48 (e.g., a first input port of beam former 50 may receive vector element $\overline{x}_0$ over data path 48-0, a second input port of beam former 50 may receive vector element $\overline{x}_1$ over data path 48-1, an $M^{th}$ input port of beam former 50 may receive element $\overline{x}_{(M-1)}$ over data path 48-(M-1), etc.).

As an example of the inverse fast Fourier transform operation performed by each IFFT 46, each vector element $\overline{x}_i$ of vector $\overline{x}$ may itself be a vector, as given by equation 1.

$$\overline{x}_i = [\overline{x}_i[0], \overline{x}_i[1], \ldots, \overline{x}_i[N-1]] \quad (1)$$

In equation 1, vector element $\overline{x}_i$ has N elements $\overline{x}_i[n]$, where n is an integer index from 0 to N−1. Each element $\overline{x}_i[n]$ in vector element $\overline{x}_i$ may be generated using equation 2.

$$x_i[n] = \sum_{k=0}^{N-1} X_i[k] \exp\left(\frac{j2\pi kn}{N}\right) \quad (2)$$

In equation 2, $\overline{X}_i[k]$ is the element k of vector element $\overline{X}_i$ (e.g., where $\overline{X}_i = [\overline{X}_i[0], \overline{X}_i[1], \ldots, \overline{X}_i[N-1]]^T$), j is equal to the square root of −1, N is the inverse fast Fourier transform length used by IFFT 46, and "exp( )" is the exponential operator.

Beam former 50 may perform beam forming operations on time domain signals $\overline{x}$ to generate P parallel output signals. The P parallel output signals may be identified by a vector $\overline{y}$ and may therefore sometimes be referred to herein as output signals $\overline{y}$. Vector $\overline{y}$ may have P columns, where each column forms a respective vector element $\overline{y}_i$ (e.g., vector $\overline{y}$ may include a first vector element $\overline{y}_0$, a second vector element $\overline{y}_1$, a $P^{th}$ vector element $\overline{y}_{(P-1)}$, etc.). Each vector element $\overline{y}_i$ is a vector of size N (e.g., vector $\overline{y}$ may have a size equal to N-by-P), where $\overline{y}_i = [\overline{y}_i[0], \overline{y}_i[1], \ldots, \overline{y}_i[N-1]]^T$. Each vector element $\overline{y}_i$ corresponds to a respective one of the output paths 60 (e.g., to a respective one of the P antenna elements 36 or antenna feeds in phased array antenna 34 of FIG. 1). Beam former 50 may output a respective vector element $\overline{y}_i$ from vector $\overline{y}$ onto each data path 52. Output signal generator 54 may receive output signals $\overline{y}$ over data paths 52 (e.g., output signal generator 54 may receive vector element $\overline{y}_0$ over data path 52-0, may receive vector element $\overline{y}_1$ over data path 52-1, may receive vector element $\overline{y}_{(P-1)}$ over data path 52-(P-1), etc.). Equation 3 may characterize the output signals $\overline{y}$ produced by beam former 50.

$$\overline{y} = \overline{x} \cdot \overline{h} \quad (3)$$

In equation 3, "." Is the matrix multiplication operator and $\overline{h}$ is an M-by-P matrix that characterizes the effects of beam former 50 in performing beam forming operations on time domain signals $\overline{x}$.

Data paths 52 may bypass updated output signal generator 54 during the first iteration of baseband processor 26 in processing serial data stream ser (e.g., $\overline{y}'$ as shown in FIG. 2 equals $\overline{y}$ during the first iteration). Output signals $\overline{y}$ may be conveyed to the input of CFR circuitry 64 over paths 62 (e.g., each vector element $\overline{y}_i$ of vector $\overline{y}$ may pass from a respective data path 52 to CFR circuitry 64 over a respective one of paths 62). The PAR of the output signals (OFDM symbols) is determined by the square of the peak amplitude divided by the mean square value of the individual output OFDM symbols, as shown by equation 4.

$$PAR(y[i]) = \frac{|\overline{y}_i|_\infty^2}{|\overline{y}_i|_2^2 / N} \quad (4)$$

In equation 4, $\overline{y}_i$ represents the $i^{th}$ output vector element (e.g., the $i^{th}$ output OFDM symbol), $|\overline{y}_i|_\infty$ is the $L_\infty$ norm of $\overline{y}_i$, $|\overline{y}_i|_2$ is the $L_2$ norm of $\overline{y}_i$, N is the size of vector element $\overline{y}_i$, and "i" is one of P indices from 0 to P−1.

CFR circuitry 64 may iteratively minimize the PAR of the output signals. At the same time, the minimization criteria may be to reduce the dynamic range of the output signals rather than increasing the average energy of the symbols, which is not an issue as an overall scaling factor can be applied later in the transmit chain to make sure that the energy of the symbols is within an acceptable range of power amplifier circuitry 58. In general, CFR circuitry 64 and baseband processor 26 may minimize PAR by reducing the peaks of the output signal, increasing the average of the output signal, or a combination of both reducing the peaks and increasing the average of the output signal.

CFR circuitry 64 may perform concurrent CFR operations on all P vector elements $\overline{y}_i$ in output signals $\overline{y}$ (in parallel) to generate M parallel frequency domain extended signals. The M parallel frequency domain extended signals may be identified by a vector $\overline{S}_{EXTEN}$ and may therefore sometimes be referred to herein as frequency domain extended signals $\overline{S}_{EXTEN}$. CFR circuitry 64 may output frequency domain extended signals $\overline{S}_{EXTEN}$ to the inputs of inverse fast Fourier transformers 46 over paths 66 and data paths 44. Each element of vector $\overline{S}_{EXTEN}$ may correspond to a respective one of the M symbols from serial data ser (e.g., vectors of frequency domain modulated subcarriers from serial data ser). Each vector element of vector $\overline{S}_{EXTEN}$ may replace a respective vector element $\overline{X}_i$ provided to inverse fast Fourier transformers 46 for the next iteration and any subsequent iterations of processing in baseband processor 26 (e.g., passing frequency domain extended signals EXTEN to data paths 44 may begin a second iteration of processing after CFR circuitry 64 has processed output signals $\bar{y}$ once for the current sequence of M symbols in serial data ser).

Inverse fast Fourier transformers 46 may convert frequency domain extended signals $\bar{S}_{EXTEN}$ into M corresponding time domain extended signals. The M time domain extended signals may be identified by a vector $\bar{s}_{EXTEN}$ and may therefore sometimes be referred to herein as time domain extended signals $\bar{s}_{EXTEN}$. Each vector element of vector $\bar{s}_{EXTEN}$ may replace a respective vector element $\bar{x}_i$ provided to beam former 50 for the current iteration of processing by baseband processor 26.

Beam former 50 may perform beam forming operations on time domain extended signals $\bar{s}_{EXTEN}$ to generate P parallel extended output signals. The P extended output signals may be identified by a vector $\bar{y}_{EXTEN}$ and may therefore sometimes be referred to herein as extended output signals $\bar{y}_{EXTEN}$. Extended output signals $\bar{y}_{EXTEN}$ may be generated by beam former 50 according to equation 3, where time domain extended signals $\bar{y}_{EXTEN}$ replace time domain signals $\bar{x}$ in equation 3 for the current iteration and any subsequent iterations of processing in baseband processor 26. Beam former 50 may pass extended output signals $\bar{y}_{EXTEN}$ to the input of output signal generator 54 over data paths 52. For the second and subsequent iterations of processing in baseband processor 26 (e.g., for a given set of M vectors of modulated subcarriers from serial data ser), output signal generator 54 may generate an updated output signals $\bar{y}'$ based on extended output signals $\bar{y}_{EXTEN}$ and the output signals $\bar{y}$ from the previous iteration of processing by baseband processor 26. For example, output signal generator 54 may include one or more adders and one or more multipliers that generate updated output signals $\bar{y}'$ using equation 5.

$$\bar{y}' = \bar{y} + \bar{\mu} \odot \bar{y}_{EXTEN} \qquad (5)$$

In equation 5, $\bar{y}$ are the output signals from the previous iteration of processing by baseband processor 26, "$\odot$" is the dot product operator, and $\bar{\mu}$ is a vector parameter. Vector parameter $\bar{\mu}$ may be selected heuristically or through an exhaustive search within predefined boundaries to find updated output signals $\bar{y}'$ that minimize PAR. For example, for column i of updated output signals (matrix) $\bar{y}'$, a parameter value $\mu_i$ can be chosen either heuristically or through an exhaustive search within predefined boundaries to find a $\bar{y}'_i = \bar{y}_i + \mu_i \bar{y}_{i_{EXTEN}}$ that minimizes the PAR for $\bar{y}'_i$. Vector parameter $\mu$ may be a matrix given by $\bar{\mu} = [\bar{\mu}_0, \bar{\mu}_1, \ldots, \bar{\mu}_{(P-1)}]$, where each vector element $\bar{\mu}_i$ of $\bar{\mu}$ has N elements and is given by $\bar{\mu}_i = [\mu_i, \mu_i, \ldots \mu_i]^T$. Output signal generator 54 may provide updated output signals $\bar{y}'$ to PAR measurement circuitry 56 over data paths 52.

PAR measurement circuitry 56 may compute the PAR of updated output signals $\bar{y}'$ (e.g., using equation 4, where updated output signals $\bar{y}'$ replace output signals $\bar{y}$ in equation 4). PAR measurement circuitry 56 may compare the computed PAR to a threshold PAR value. The threshold PAR value may be determined during design, manufacture, calibration, and/or testing of device 10, may be determined by industry or regulatory standards, or may be any other desired threshold PAR value associated with satisfactory performance by baseband processor 26. If the computed PAR is less than or equal to the PAR threshold value or a predetermined maximum number of iterations have occurred, updated output signals $\bar{y}'$ may be transmitted to power amplifier circuitry 58 over data paths 52. Power amplifier circuitry 58 may amplify updated output signals $\bar{y}'$ and may output the amplified signals onto output paths 60 (e.g., for transmission by antenna elements 36 of FIG. 1). Because the updated output signals exhibit satisfactory PAR, power amplifier circuitry 58 may amplify the updated output signals without exhibiting degraded performance.

If the computed PAR exceeds the PAR threshold value and the predetermined maximum number of iterations have not yet occurred, updated output signals $\bar{y}'$ may be passed to CFR circuitry 64 over paths 62. CFR circuitry 64 may then produce frequency domain extended signals $\bar{S}_{EXTEN}$ based on updated output signals $\bar{y}'$ (e.g., where updated output signals $\bar{y}'$ replace output signals $\bar{y}$ in processing by CFR circuitry 64 for the second iteration and any subsequent iterations of processing by baseband processor 26). Baseband processor 26 may continue to iterate in this way until the updated output signals $\bar{y}'$ exhibit a PAR that is less than or equal to the PAR threshold value or the predetermined maximum number of iterations have occurred, thereby ensuring that power amplifier circuitry 58 outputs signals for antenna elements 36 without exhibiting degraded performance. This example is merely illustrative. If desired, PAR measurement circuitry 56 may be omitted and updated output signals $\bar{y}'$ may be passed to power amplifier circuitry 58 after the predetermined maximum number of iterations have occurred, after a predetermined amount of time, or in response to any desired trigger condition.

The example of FIG. 2 is merely illustrative. If desired, power amplifier circuitry 58 may be replaced by an inverse Butler matrix interposed on data paths 52 between beam former 50 and output signal generator 54, a stage of amplifiers such as traveling-wave tube amplifiers (TWTAs) interposed on data paths 52 between PAR measurement circuitry 56 and output paths 60, and a Butler matrix interposed on data paths 52 between the TWTAs and output paths 60. In this arrangement, beam former 50, the inverse Butler matrix, and the Butler matrix may sometimes be referred to collectively as the beam former circuitry in baseband processor 26. The Butler matrix may include, for example, hybrid couplers with fixed phase shifts, where power is switched to desired ports of the hybrid couplers to control the direction of the resulting signal beams produced by phased array antenna 34 (FIG. 1). Any desired amplifier and/or beam forming circuitry architecture may be used in baseband processor 26. Data paths 44, 48, and 52 may sometimes be referred to herein simply as paths, data lines, lines, or conductive lines (e.g., M data lines 44 may sometimes be referred to collectively as forming a single data path, M data lines 48 may sometimes be referred to collectively as forming a single data path, P data lines 52 may sometimes be referred to collectively as forming a single data path, etc.).

Figure 3:
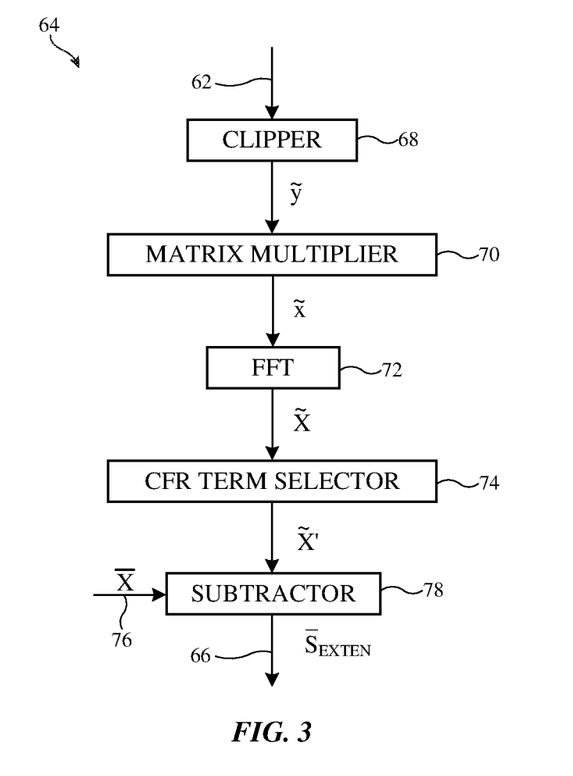
FIG. 3 is a circuit diagram of illustrative crest factor reduction circuitry that concurrently operates on multiple OFDM symbols in parallel in accordance with some embodiments.

FIG. 3 is a circuit diagram of CFR circuitry 64 for concurrently operating on M OFDM symbols in parallel. As shown in FIG. 3, CFR circuitry 64 may include clipping circuitry such as clipper 68 coupled to paths 62. Clipper 68 may receive output signals $\bar{y}$ over paths 62 during the first iteration of baseband processor 26 or may receive updated output signals $\bar{y}'$ over paths 62 during subsequent iterations of baseband processor 26. For the sake of illustration, the operation of CFR circuitry 64 on output signals $\bar{y}$ is described herein as an example. These operations may be modified for subsequent iterations by replacing output signals $\bar{y}$ with updated output signals $\bar{y}'$.

Clipper 68 may perform clipping operations on output signals $\bar{y}$ to produce clipped signals. The clipped signals may be identified by a vector $\tilde{y}$ and may therefore sometimes be referred to herein as clipped signals $\tilde{y}$. Clipper 68 may clip output signals $\bar{y}$ by capping any element of output signals $\bar{y}$ that exceeds a threshold magnitude $\zeta$ at threshold magnitude $\zeta$ while also preserving the phase of that element.

In other words, clipper 68 may generate clipped signals $\tilde{y}$ having vector elements $\tilde{y}_i$ (e.g., $\tilde{y}=[\tilde{y}_0, \tilde{y}_1, \ldots, \tilde{y}_{(P-1)}]$), where each of the vector elements $\tilde{y}_i$ is given by $\tilde{y}_i=[\tilde{y}_i[0], \tilde{y}_i[1], \ldots, \tilde{y}_i[N-1]]^T$. Each element $\tilde{y}_i[n]$ of vector element $\tilde{y}_i$ is then given by equation 6.

$$\tilde{y}_i[n] = \begin{cases} y_i[n], & |y_i[n]| \leq \zeta \\ \zeta \exp(j\angle(y_i[n])), & |y_i[n]| > \zeta \end{cases} \quad (6)$$

In equation 6, i is an integer less than or equal to (P−1) and greater than or equal to zero, n is an integer ranging from 0 to N−1, and the term "$\exp(j\angle L(\bar{y}[n]))$" serves to preserve the phase of the output signal when the output signal is clipped to threshold magnitude $\zeta$. Clipping output signals $\bar{y}$ may produce distortion in clipped signals $\tilde{y}$.

Clipper 68 may pass clipped signals $\tilde{y}$ to matrix multiplier 70. Matrix multiplier 70 may apply a pseudo inverse of the effect of beam former 50 (FIG. 2) on the clipped signals to produce time domain modified signals. The time domain modified signals may be identified by a vector $\tilde{x}$ and may therefore sometimes be referred to herein as modified time domain OFDM signals $\tilde{x}$. Matrix multiplier 70 may, for example, generate modified time domain OFDM signals $\tilde{x}$ using equation 7.

$$\tilde{x} = \tilde{y} \cdot \bar{h}^H (\bar{h} \cdot \bar{h}^H)^{-1} \quad (7)$$

In equation 7, $\bar{h}^H$ is the Hermitian transpose of matrix h from equation 3, which characterizes the effects of beam former 50 in performing beam forming operations on time domain signals $\bar{x}$ of FIG. 2.

Matrix multiplier 70 may pass modified time domain OFDM signals $\tilde{x}$ to fast Fourier transform circuitry such as fast Fourier transformer (FFT) 72. FFT 72 may convert modified time domain OFDM signals $\tilde{x}$ into frequency domain modified signals. The frequency domain modified signals may be identified by a vector $\tilde{X}$ and may therefore sometimes be referred to herein as frequency domain modified signals $\tilde{X}$. Vector $\tilde{X}$ may be given by $\tilde{X}=[\tilde{X}_0, \tilde{X}_1, \tilde{X}_{(M-1)}]$, where each vector element $\tilde{X}_i$ of vector $\tilde{X}$ is given by $\tilde{X}_i=[[\tilde{X}_i[0], \tilde{X}_i[1], \ldots, \tilde{X}_i[N-1]]^T$.

FFT 72 may pass frequency domain modified signals $\overline{X}$ to CFR term selector 74. CFR term selector 74 may sometimes be referred to herein as CFR term selection circuitry 74, term selection circuitry 74, or term selector 74. Assuming the use of M-QAM or M-PSK modulation, each symbol in frequency domain modified signals $\overline{X}$ will be modified such that each symbol is a valid extension of the original constellation. If desired, CFR term selector 74 may restore invalid extensions in frequency domain modified signals $\tilde{X}$ to their original positions. CFR term selector 74 may output updated modified signals $\tilde{X}'$. Updated modified signals $\tilde{X}'$ may be given by $\tilde{X}'=[\tilde{X}'_0, \tilde{X}'_1, \ldots \tilde{X}'_{(M-1)}]$, where each vector element $\tilde{X}'_i$ of vector $\tilde{X}'$ is given by $\tilde{X}'=[[\tilde{X}'_i[0], \tilde{X}'_i[1], \ldots, \tilde{X}'_i[N-1]]^T$.

Operating on signals with baseband processor 26 may serve to move the constellation diagram position of one or more of the I/Q symbols in the frequency domain signals by the time the symbols are processed by CFR term selector 74. Those symbols (e.g., those elements of frequency domain modified signals $\tilde{X}$) that moved in a valid direction within the constellation diagram may be retained in updated modified signals $\tilde{X}'$. Those symbols (elements) that moved in an invalid direction within the constellation diagram may be replaced with the corresponding original symbol from frequency domain signals $\overline{X}$ in updated modified signals $\tilde{X}'$.

Updated modified signals $\tilde{X}'$ may thereby include a mix of improved symbols and original symbols. Each iteration of processing by baseband processor 26 may serve to increase the overall number of improved symbols in updated modified signals $\tilde{X}'$, thereby optimizing performance. The operation of CFR term selector 74 may serve to remove distortion introduced by clipper 68 if the distortion would be detrimental to performance. At the same time, the operation of CFR term selector 74 may keep the distortion introduced by clipper 68 in updated modified signals $\tilde{X}'$ if the distortion improves or does not affect performance.

CFR term selector 74 may pass updated modified signals $\tilde{X}'$ to subtractor 78. Subtractor 78 may receive frequency domain signals $\overline{X}$ over path 76 (e.g., from the output of switch 42 of FIG. 2). Subtractor 78 may generate frequency domain extended signals $\overline{S}_{EXTEN}$ by subtracting frequency domain signals $\overline{X}$ from updated modified signals $\tilde{X}'$. Subtractor 78 may output frequency domain extended signals $\overline{S}_{EXTEN}$ onto paths 66.

While the signals shown in FIGS. 2 and 3 are described above as being vectors, the vector elements of the vectors may also be vectors (e.g., the vectors may be two-dimensional matrices or vectors of vectors). Each vector has a corresponding set of vector elements (e.g., matrix elements). The vectors may equivalently be referred to herein as sets of elements (e.g., frequency domain extended signals $\overline{S}_{EXTEN}$ may sometimes be referred to as frequency domain extension set $\overline{S}_{EXTEN}$, updated modified signals $\tilde{X}'$ may sometimes be referred to as updated modified set $\tilde{X}'$, frequency domain signals $\overline{X}$ may sometimes be referred to as frequency domain set $\overline{X}$, output signals $\bar{y}$ (FIG. 2) may sometimes be referred to as output set $\bar{y}$, etc.). The components in baseband processor 26 (e.g., as shown in FIGS. 2 and 3) may be implemented using any desired digital logic gates arranged in any desired manner and/or using any other desired circuitry, state machines, hardware, and/or software that performs the operations described herein.

Figure 4:
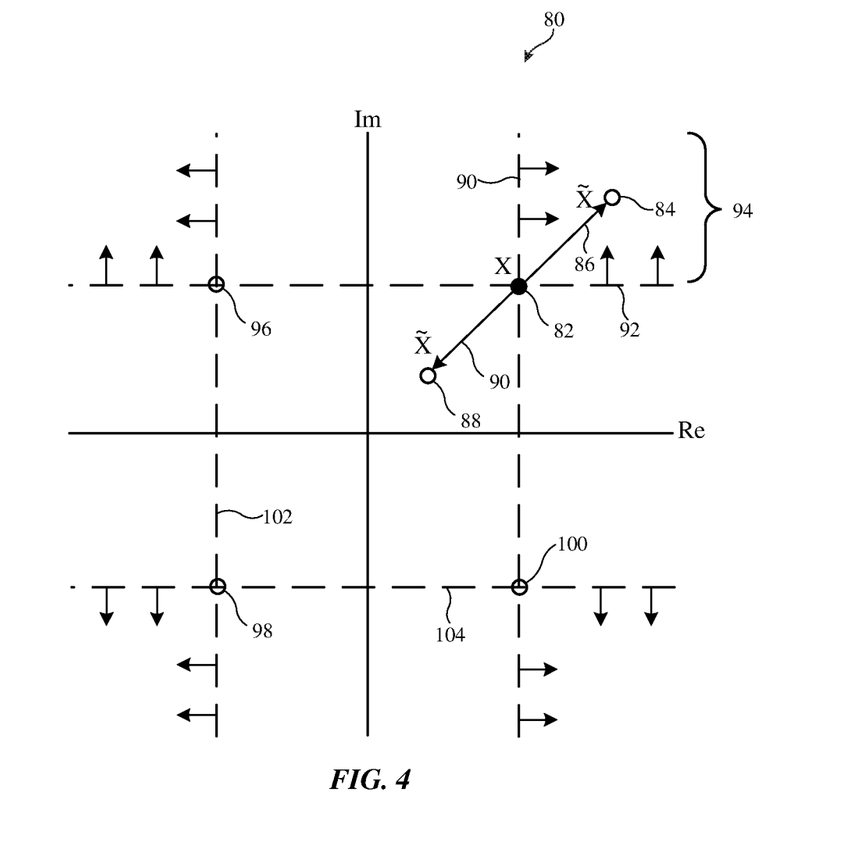
FIG. 4 is a constellation diagram showing how an illustrative crest factor reduction term selector may be used to replace terms of frequency domain modified signals in accordance with some embodiments.

FIG. 4 is a constellation diagram showing how CFR term selector 74 may output updated modified signals $\tilde{X}'$ based on changes to the symbols produced by baseband processor 26. As shown by constellation diagram 80 of FIG. 4 (e.g., a constellation diagram having a horizontal real axis and a vertical imaginary axis), the frequency domain signals $\overline{X}$ provided to inverse fast Fourier transform circuitry 46 (FIG. 2) may include one or more symbols such as symbols 82, 100, 98, and 96. This is merely illustrative and, in general, frequency domain signals $\overline{X}$ may include any desired number of symbols arranged in any desired pattern on the constellation diagram.

Consider an example in which CFR term selector 74 (FIG. 3) is processing the symbol (element) of frequency domain modified signals $\overline{X}$ corresponding to symbol 82 in frequency domain signals $\overline{X}$ (e.g., a given element $X_i$ from vector $\overline{X}$). In generating frequency domain modified signals $\tilde{X}$ based on frequency domain signals $\overline{X}$, symbol 82 may move on constellation diagram 80 in a given direction. If symbol 82 has moved to location 84 in frequency domain modified signals $\tilde{X}$, as shown by arrow 86, this move may be a valid extension of symbol 82 that serves to improve the performance of baseband processor 26 relative to scenarios where symbol 82 remains in place on constellation diagram 80.

In general, any move that places symbol 82 at a location within valid extension region 94 in constellation diagram 80 may be a valid extension of symbol 82 that serves to improve the performance of baseband processor 26. Valid extension region 94 may have edges defined by vertical line 90 and horizontal line 92 running through symbol 82 (e.g., valid extension region 94 may lie to the right of vertical line 90 and above horizontal line 92, within the upper-right quadrant of constellation diagram 80). Such extensions into valid extension region 94 effectively increase the distance (margin) between the symbol and the origin in constellation diagram 80. Conversely, if symbol 82 has moved closer to the origin or to another location outside of valid extension region 94 in frequency domain modified signals $\tilde{X}$, such as to location 88 (as shown by arrow 90), this move may be an invalid extension of symbol 82 that does not serve to improve the performance of baseband processor 26.

CFR term selector 74 may process frequency domain modified signals $\tilde{X}$ to determine whether symbol 82 from frequency domain signals $\overline{X}$ has moved to within valid extension region 94 by the time the symbol is received as an element of frequency domain modified signals $\tilde{X}$ (e.g., to a position to the right of vertical line 90 and above horizontal line 92). If symbol 82 has not moved or has moved to within valid extension region 94, CFR term selector 74 may allow that symbol (element) from frequency domain modified signals $\tilde{X}$ to remain in updated modified signals $\tilde{X}'$. If symbol 82 has moved to a location other than within valid extension region 94 (e.g., to a location closer to the origin), CFR term selector 74 may replace the symbol that has moved with the original symbol 82 from frequency domain signals $\overline{X}$. This may ensure that each symbol either improves or maintains the performance level of baseband processor 26.

Similar operations may be performed for each symbol in frequency domain modified signals $\tilde{X}$. For example, the valid extension region for symbol 96 may lie above horizontal line 92 and to the left of vertical line 102 running through symbol 96 (e.g., within the upper-left quadrant of constellation diagram 80). Similarly, the valid extension region for symbol 98 may lie to the left of vertical line 102 and below horizontal line 104 running through symbol 98 (e.g., within the lower-left quadrant of constellation diagram 80). Finally, the valid extension region for symbol 100 may lie to the right of vertical line 90 and below horizontal line 104 (e.g., within the lower-right quadrant of constellation diagram 80). The valid extension regions (e.g., valid extension region 94) may sometimes be referred to herein as corner-point extension regions (e.g., because the valid extension regions have a corner located at a given symbol from frequency domain signals $\overline{X}$).

This example is merely illustrative and, in general, the valid extension region for each symbol in frequency domain modified signals $\tilde{X}$ may lie within a rectangle extending away from the origin and having orthogonal sides defined by a vertical line and a horizontal line running through that symbol. In this way, each element of updated modified signals $\tilde{X}'$ either has not moved in constellation diagram 80 (relative to that symbol's position in frequency domain signals $\overline{X}$) or has moved to within a valid extension region of the constellation diagram that serves to improve the performance of baseband processor 26.

Consider another example in which 4-QAM or QPSK modulation is used. In this example, not all points that are outside of the valid extension region will be returned to their original position by the selection operation. For example, if a modified symbol $\tilde{X}_i[k]$ is represented as $\tilde{X}_i[k]=a'+ib'$, where a' is the real part and b' is the imaginary part of the symbol $\tilde{X}_i[k]$, and the original symbol $\overline{X}_i[k]$ is represented as $\overline{X}_i[k]=a+ib$, where a is the real part and b is the imaginary part of the original symbol, then a' may be considered a valid extension of a if sign(a')=sign(a) and |a'|≥|a|, where |a| is the absolute value of a. Similarly, b' may be considered a valid extension of b if sign(b')=sign(b) and |b'|≥|b|. Thus, a valid extension a" is formed from a if sign(a') does not equal sign(a) or |a'|<|a|, otherwise a" is equal to a'. Similarly, a valid extension b" is formed from b if sign(b') does not equal sign(b) or |b'|<|b|, otherwise b" is equal to b'. $\tilde{X}_i[k]$ may then be rewritten in terms of valid extensions a" and b" as $\tilde{X}_i[k]$=a"+ib".

This may serve to mitigate any distortion introduced by clipper 68 of FIG. 3 if detrimental to performance and may serve to improve the overall performance of baseband processor 26 (e.g., by minimizing the PAR of the signals output by the baseband processor). Subsequent iterations of processing by baseband processor 26 may serve to further improve the overall performance of baseband processor 26 (e.g., even if some symbols have not been extended to within a corresponding valid extension region within a given iteration, subsequent iterations may serve to extend the symbols into a corresponding valid extension region of constellation diagram 80).

Figure 5:
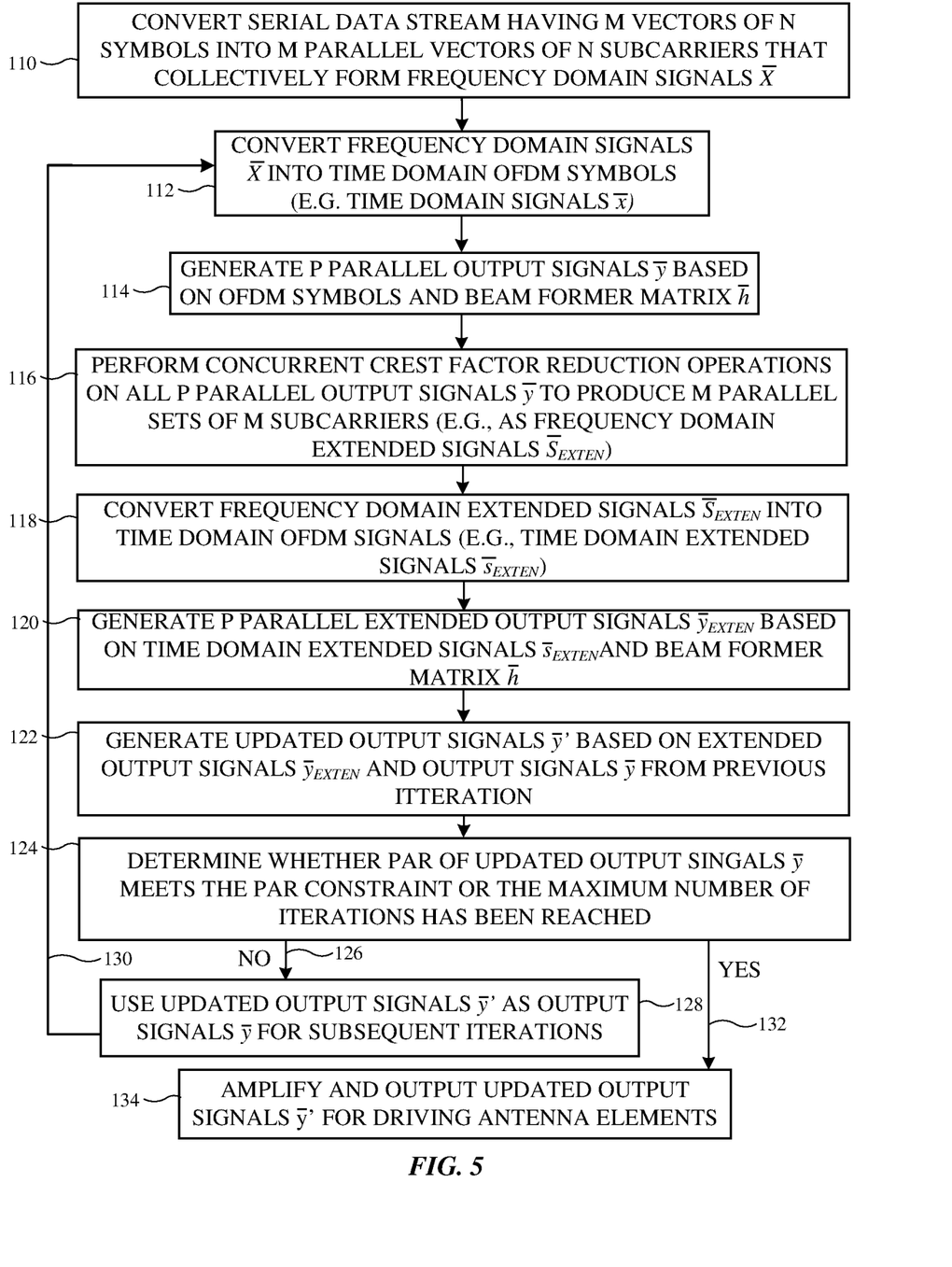
FIG. 5 is a flow chart of illustrative operations involved in performing parallel crest factor reduction operations on multiple OFDM symbols from a serial data stream in accordance with some embodiments.

FIG. 5 is a flow chart of illustrative operations that may be performed by baseband processor 26 in outputting signals for transmission on antenna elements 36 (FIG. 1) based on M*N sequential frequency domain modulated symbols received in serial data ser of FIG. 2. At operation 110 of FIG. 5, a first iteration of processing on the M*N modulated symbols in serial data stream ser may begin when switch 42 converts the M*N modulated symbols into M parallel vectors of frequency domain signals $\overline{X}$ on data paths 44.

At operation 112, inverse fast Fourier transformers 46 may convert frequency domain signals $\overline{X}$ into corresponding OFDM symbols (e.g., time domain signals $\overline{x}$ as generated using equation 2). Inverse fast Fourier transformers 46 may pass the OFDM symbols to beam former 50.

At operation 114, beam former 50 may generate P parallel output OFDM symbols (e.g., output signals $\overline{y}$) on data paths 52 based on the OFDM symbols received from inverse fast Fourier transformers 46 (e.g., beam former 50 may perform beam forming operations that produce output signals $\overline{y}$ characterized by equation 3). During the first iteration of processing on the M OFDM symbols, output signal generator 54 and PAR measurement circuitry 56 may pass the output OFDM symbols (e.g., output signals $\overline{y}$) to CFR circuitry 64 via paths 62 without modification.

At operation 116, CFR circuitry 64 may perform concurrent CFR operations on all P of the output OFDM symbols (e.g., output signals $\overline{y}$) in parallel to produce M parallel modulated subcarrier vectors (e.g., frequency domain extended signals $\overline{S}_{EXTEN}$). CFR circuitry 64 may output frequency domain extended signals $\overline{S}_{EXTEN}$ onto data paths 44 via paths 66. This may begin a second iteration of processing on the M OFDM symbols from serial data stream ser.

At operation 118, inverse fast Fourier transformers 46 may convert frequency domain extended signals $\overline{S}_{EXTEN}$ into OFDM symbols (e.g., time domain extended signals $S_{EXTEN}$). Inverse fast Fourier transformers 46 may transmit the OFDM symbols (time domain extended signals $\overline{S}_{EXTEN}$) to beam former 50 via data paths 48.

At operation 120, beam former 50 may generate P parallel extended output OFDM symbols (e.g., extended output signals $\overline{y}_{EXTEN}$) V on data paths 52 based on the OFDM symbols received from inverse fast Fourier transformers 46 (e.g., extended signals $\overline{s}_{EXTEN}$) For example, beam former 50 may perform beam forming operations that produce extended output signals $\overline{y}_{EXTEN}$ characterized by equation 3. Beam former 50 may transmit extended output signals $\overline{y}_{EXTEN}$ to output signal generator 54 via data paths 52.

At operation 122, during the second and subsequent iterations of processing on the M*N modulated symbols from serial data stream ser, output signal generator 54 may generate updated output signals $\bar{y}'$ based on extended output signals $\bar{y}_{EXTEN}$ and the output signals $\bar{y}$ from the previous iteration of processing (e.g., using equation 5). Output signal generator 54 may transmit updated output signals $\bar{y}'$ to PAR measurement circuitry 56 via data paths 52.

At operation 124, during the second and subsequent iterations of processing on the M*N modulated symbols from serial data stream ser, PAR measurement circuitry 56 may compute a PAR value of updated output signals $\bar{y}'$ (e.g., using equation 4). PAR measurement circuitry 56 may determine whether the computed PAR value has fallen below a predetermined threshold value (or is within a given margin of the predetermined threshold value). If the computed PAR value exceeds the predetermined threshold value (e.g., is not within the given margin of the predetermined threshold value) and/or a predetermined maximum number of iterations has not yet been reached, processing may proceed to operation 128, as shown by arrow 126.

At operation 128, baseband processor 26 may pass updated output signals $\bar{y}'$ to CFR circuitry 64 via paths 62. Processing may loop back to operation 112 as shown by arrow 130. CFR circuitry 64 may perform subsequent CFR operations on updated output signals $\bar{y}'$ (e.g., updated output signals $\bar{y}'$ may replace output signals $\bar{y}$ in the CFR operations performed during the second iteration and may replace the updated output signals $\bar{y}'$ from the previous iteration for iterations beyond the second iteration). Baseband processor 26 may continue to perform iterations of processing on the frequency domain symbols from serial data stream ser until updated output signals $\bar{y}'$ exceed the PAR threshold value or the predetermined maximum number of iterations has been reached.

When updated output signals $\bar{y}'$ exhibit a PAR that falls below the PAR threshold value (e.g., is within the given margin of the predetermined threshold value) or the predetermined maximum number of iterations has been reached, processing may proceed to operation 134 as shown by arrow 132. At operation 134, PAR measurement circuitry 56 may pass updated output signals $\bar{y}'$ to power amplifier circuitry 58 (rather than looping back to CFR circuitry 64). Power amplifier circuitry 58 may amplify updated output signals $\bar{y}'$ and may output the amplified signals onto output path 60 for transmission by antenna elements 36 (FIG. 1). Antenna elements 36 may transmit the amplified signals within M concurrent signal beams 38 that are oriented in respective beam directions. This example is merely illustrative. In scenarios where PAR measurement circuitry 56 is omitted, processing may proceed to operation 134 after a predetermined number of iterations or after a predetermined time period, as examples.

Figure 6:
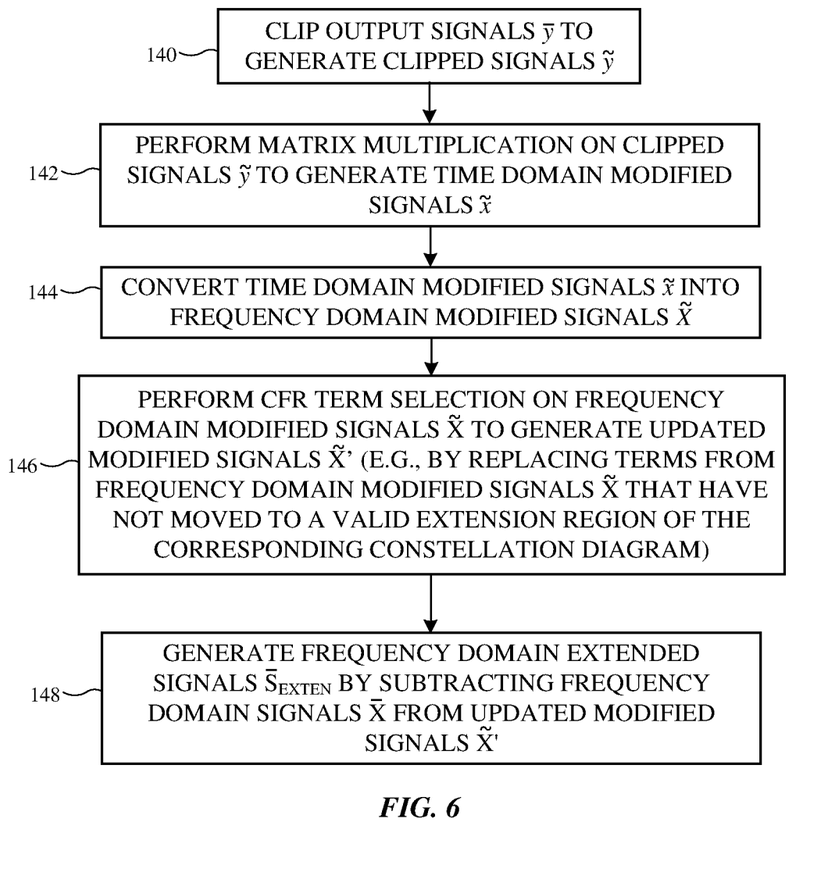
FIG. 6 is a flow chart of illustrative operations that may be performed by crest factor reduction circuitry in concurrently operating on multiple OFDM symbols in parallel in accordance with some embodiments.

FIG. 6 is a flow chart of illustrative operations that may be performed by CFR circuitry 64 in performing CFR operations on output signals $\bar{y}$ (e.g., during a first iteration of operation 116 of FIG. 5). Similar operations may also be performed on subsequent iterations of operation 116 of FIG. 5 (e.g., where output signals $\bar{y}$ are replaced by updated output signals $\bar{y}'$ of the previous iteration).

At operation 140, clipper 68 of FIG. 3 may clip output signals $\bar{y}$ to produce clipped signals $\tilde{y}$ (e.g., using equation 6). Clipper 68 may transmit clipped signals $\tilde{y}$ to matrix multiplier 70.

At operation 142, matrix multiplier 70 may generate time domain modified signals $\tilde{x}$ by performing matrix multiplication on clipped signals $\tilde{y}$ (e.g., using equation 7). Matrix multiplier 70 may transmit time domain modified signals $\tilde{x}$ to FFT 72.

At operation 144, FFT 72 may convert time domain modified signals $\tilde{x}$ into corresponding frequency domain modified signals $\tilde{X}$. FFT 72 may transmit frequency domain modified signals $\tilde{X}$ to CFR term selector 74.

At operation 146, CFR term selector 74 may produce updated modified signals $\tilde{X}'$ by performing CFR term selection on frequency domain modified signals $\tilde{X}$. For example, CFR term selector 74 may include, in updated modified signals $\tilde{X}'$, the terms (symbols) in frequency domain modified signals $\tilde{X}$ that have not moved or that have moved to valid extension regions relative to the corresponding terms (symbols) in frequency domain signals $\bar{X}$ (e.g., valid extension regions such as valid extension region 94 of FIG. 4). CFR term selector 74 may replace the symbols in frequency domain modified signals $\tilde{X}$ that have moved to locations in the constellation diagram that are outside of a valid extension region with the corresponding term (symbol) from frequency domain signals $\bar{X}$. CFR term selector 74 may transmit updated modified signals $\tilde{X}'$ to subtractor 78.

At operation 148, subtractor 78 may generate frequency domain extended signals $\bar{S}_{EXTEN}$ by subtracting frequency domain signals $\bar{X}$ from updated modified signals $\tilde{X}'$. Subtractor 78 may transmit frequency domain extended signals $\bar{S}_{EXTEN}$ to data paths 44 to begin the next iteration of processing.

Figure 7:
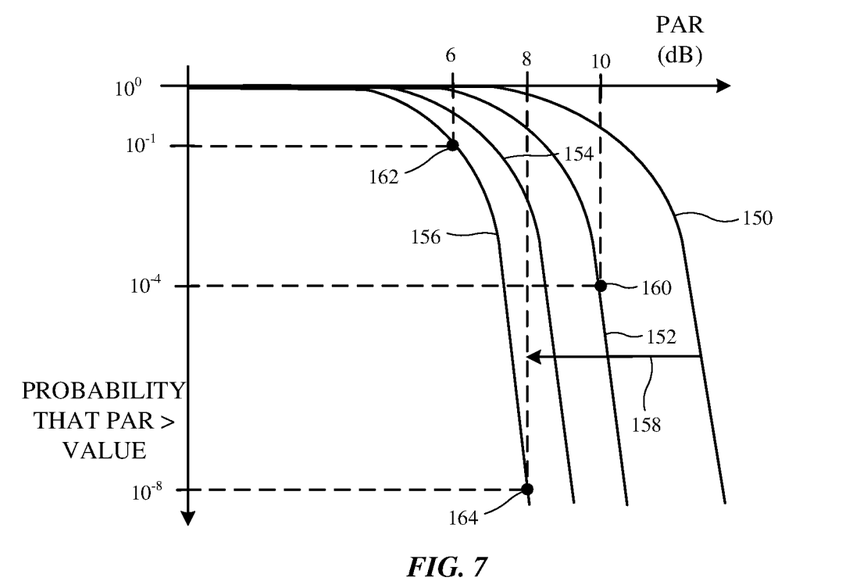
FIG. 7 is a plot showing how an illustrative baseband processor, e.g., of the type shown in FIGS. 1-3, may optimize wireless performance during concurrent signal transmissions in accordance with some embodiments.

FIG. 7 is a plot showing how performing CFR operations in this way may optimize the wireless performance of baseband processor 26. The horizontal axis of FIG. 7 plots PAR in dB. The vertical axis of FIG. 7 plots the probability that PAR is greater than the corresponding PAR value on the horizontal axis. In the example of FIG. 7, there are M=8 concurrently processed OFDM symbols, each corresponding to a respective one of eight signal beams 38, there are P=64 antenna elements 36 in the phased array antenna, the FFT and IFFT circuitry has a size set to N=256, the clipping threshold value $\zeta$ is 3.86 dB, and the corresponding modulation scheme is a QPSK modulation scheme. This is merely illustrative and, in general, M, P, N, and $\zeta$ may have other values and other modulation schemes may be used.

As shown in FIG. 7, curve 150 plots the PAR of output signals $\bar{y}$ during the first iteration of processing by baseband processor 26 (e.g., without performing CFR operations on the output signals). Curve 152 plots the PAR of updated output signals $\bar{y}'$ as output by output signal generator 54 during a second iteration of processing by baseband processor 26. Curve 154 plots the PAR of updated output signals $\bar{y}'$ as output by output signal generator 54 during a third iteration of processing by baseband processor 26. Curve 156 plots the PAR of updated output signals $\bar{y}'$ as output by output signal generator 54 during a fourth iteration of processing by baseband processor 26.

To help interpret the plot of FIG. 7, consider one example in which a second iteration of processing is performed (as illustrated by curve 152). As shown by point 160, there may be a probability of $10^{-4}$ that the PAR of the updated output signals during this iteration is greater than 10. Similarly, in a third iteration of processing (as illustrated by curve 156), point 164 shows that there may be a probability of $10^{-8}$ that the PAR of the updated output signals during this iteration is greater than 8. As a third example, in a fourth iteration of processing (as illustrated by curve 156), point 162 shows that there may be a probability of $10^{-1}$ that the PAR of the updated output signals during this iteration is greater than 6.

As shown by curves 150 and 152, the CFR operations performed by CFR circuitry 64 concurrently on each of the M OFDM symbols in the time domain may serve to improve the overall PAR of the signals amplified by power amplifier circuitry 58. As shown by arrow 158, increasing the number of iterations of processing by baseband processor 25 may serve to further reduce the PAR of the signals (e.g., by +5 dB or more). This may allow power amplifier circuitry 58 to transmit amplified signals on output paths 60 without inducing degraded performance associated with the high dynamic range of the aggregated signals in the amplifier circuitry of external communications equipment that receives the transmitted amplified signals. The example of FIG. 7 is merely illustrative. Curves 150-156 may have other shapes in practice.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
   a demultiplexing switch;
   amplifier circuitry;
   a beam former coupled between the demultiplexing switch and the amplifier circuitry;
   first parallel data paths coupled between the demultiplexing switch and the beam former;
   second parallel data paths coupled between the beam former and the amplifier circuitry;
   inverse fast Fourier transform (IFFT) circuitry interposed on the first parallel data paths between the demultiplexing switch and the beam former; and
   crest factor reduction (CFR) circuitry interposed on a feedback path between the second parallel data paths and the first parallel data paths.

2. The electronic device of claim 1, wherein the IFFT circuitry has an input and the CFR circuitry has an output coupled to the first parallel data paths at the input of the IFFT circuitry.

3. The electronic device of claim 1, wherein the CFR circuitry comprises:
   a clipper having an input coupled to the second parallel data paths.

4. The electronic device of claim 3, wherein the CFR circuitry comprises:
   a matrix multiplier having an input coupled to an output of the clipper.

5. The electronic device of claim 4, wherein the CFR circuitry comprises:
   a fast Fourier transformer (FFT) having an input coupled to an output of the matrix multiplier.

6. The electronic device of claim 5, wherein the CFR circuitry comprises:
   a term selector having an input coupled to an output of the FFT.

7. The electronic device of claim 6, wherein the CFR circuitry comprises a subtractor coupled between an output of the term selector and the first parallel data paths.

8. The electronic device of claim 1, further comprising:
   a baseband processor, wherein the baseband processor includes the demultiplexing switch, the beam former, the IFFT circuitry, and the CFR circuitry.

9. The electronic device of claim 1, wherein the amplifier circuitry comprises power amplifiers coupled to the second parallel data paths.

10. The electronic device of claim 1, further comprising:
    a phased array antenna having a plurality of antenna elements, the amplifier circuitry being configured to output wireless data for transmission by the plurality of antenna elements in the phased array antenna, wherein the demultiplexing switch is configured to convert M*N modulated symbols from a serial data stream into M parallel frequency domain vectors of length N, the first parallel data paths comprise M parallel data paths, the IFFT circuitry is configured to convert the M parallel frequency domain vectors into M parallel orthogonal frequency division multiplexing (OFDM) symbols, the second parallel data paths comprise P parallel data paths, the beam former is configured to convert the M parallel OFDM symbols into P parallel output OFDM symbols on the P parallel data paths, the phased array antenna comprises P antenna elements, and the CFR circuitry is configured to perform CFR operations concurrently on each of the P parallel output OFDM symbols.

11. A method of using a baseband processor to generate data for transmission by a phased array antenna within a plurality of concurrent signal beams, the method comprising:
    with a demultiplexer, converting sequential modulated symbols from a serial data stream into parallel vectors of frequency domain symbols that are output onto parallel data paths;
    with a beam former having input ports coupled to the parallel data paths, generating parallel output signals based on the parallel vectors of frequency domain symbols;
    with crest factor reduction (CFR) circuitry, performing CFR operations concurrently on the parallel output signals to generate parallel extended signals; and
    with the CFR circuitry, outputting the parallel extended signals onto the parallel data paths.

12. The method of claim 11, further comprising:
    with inverse fast Fourier transformers (IFFTs) interposed on the parallel data paths, converting the parallel signals from a frequency domain to a time domain; and
    with the IFFTs, converting the parallel extended signals from the frequency domain to the time domain.

13. The method of claim 12, further comprising:
    with the beam former, generating parallel extended output signals based on the parallel extended signals;
    with an output signal generator, generating updated parallel output signals based on the parallel output signals and the parallel extended output signals; and
    with peak-to-average power ratio (PAR) measurement circuitry,
    computing a PAR of the updated parallel output signals.

14. The method of claim 13, further comprising:
    with amplifier circuitry, when the computed PAR is less than a threshold value or a predetermined maximum number of iterations has been reached, amplifying the updated parallel output signals for transmission by the phased array antenna;

with the CFR circuitry, when the computed PAR is greater than or equal to the threshold value and the predetermined maximum number of iterations has not been reached, generating additional parallel extended signals by performing additional CFR operations on the updated parallel output signals; and with the CFR circuitry, outputting the additional parallel extended signals onto the parallel data paths.

15. The method of claim 11, wherein performing the CFR operations comprises:

with a clipper, clipping the parallel output signals to generate clipped signals;

with a matrix multiplier, performing matrix multiplication on the clipped signals to generate modified signals;

with a fast Fourier transformer (FFT), converting the modified signals from a time domain to a frequency domain;

with a CFR term selector, generating updated modified signals by replacing a first set of elements in the modified signals in the frequency domain while retaining a second set of elements in the modified signals in the frequency domain; and with a subtractor, generating the parallel extended signals by subtracting the parallel signals from the updated modified signals.

16. The method of claim 15, wherein the second set of elements comprise symbols that have moved, from original symbol positions in a constellation diagram associated with the parallel signals produced by the switch, into extension regions of the original symbol positions in the constellation diagram.

17. The method of claim 11, wherein the sequential modulated symbols comprise M vectors of modulated subcarriers, the plurality of concurrent signal beams comprises M concurrent signal beams, the phased array antenna comprises P antenna elements, the parallel vectors of frequency domain symbols comprise M parallel vectors of frequency domain symbols, the parallel data paths comprise M parallel data paths, the beam former has P output ports, the parallel output signals comprise P parallel output signals, and the parallel extended signals comprise M parallel extended signals.

18. A non-transitory computer-readable storage medium storing one or more programs configured to be executed by at least one processor of an electronic device having P antenna elements, and the one or more programs including instructions for:

forming M concurrent signal beams using the P antenna elements;

de-serializing M sequential modulated symbols from a serial data stream into M parallel frequency domain vectors of modulated subcarriers;

converting the M parallel frequency domain vectors into M parallel orthogonal frequency-division multiplexing (OFDM) symbols;

performing beam forming operations on the M parallel OFDM symbols that produce P parallel output signals; and concurrently performing crest factor reduction (CFR) operations on the P parallel output signals that generate M parallel frequency domain extended signals.

19. The non-transitory computer-readable storage medium of claim 18, the one or more programs further including instructions for:

converting the M parallel frequency domain extended signals into M parallel time domain extended signals;

performing beam forming operations on the M parallel time domain extended signals that produce P parallel extended output signals;

generating P parallel updated output signals based on the P parallel extended output signals and the P parallel output signals; and concurrently peforming CFR operations on the P parallel updated output signals;

amplifying and transmitting the P parallel updated output signals within the M concurrent signal beams when a peak-to-average power ratio (PAR) of the P parallel updated output signals is less than or equal to a threshold PAR value; and concurrently performing the CFR operations on the P parallel updated output signals when the PAR of the P parallel updated output signals exceeds the threshold PAR value.

20. The non-transitory computer-readable storage medium of claim 18, the one or more programs further including instructions for:

converting the M parallel frequency domain extended signals into M parallel time domain extended signals;

performing beam forming operations on the M parallel time domain extended signals that produce P parallel extended output signals;

generating P parallel updated output signals based on the P parallel extended output signals and the P parallel output signals;

concurrently performing CFR operations on the P parallel updated output signals.

* * * * *